(12) United States Patent
Armitt et al.

(10) Patent No.: US 11,169,119 B2
(45) Date of Patent: Nov. 9, 2021

(54) TRANSDUCER ASSEMBLY

(71) Applicant: GB Inspection Systems Ltd, Staffordshire (GB)

(72) Inventors: Timothy James Armitt, Derbyshire (GB); Neil Dean Smith, Staffordshire (GB)

(73) Assignee: GB INSPECTION SYSTEMS LTD., Staffordshire (GB)

( * ) Notice: Subject to any disclaimer, the term of this patent is extended or adjusted under 35 U.S.C. 154(b) by 214 days.

(21) Appl. No.: 16/471,301

(22) PCT Filed: Dec. 20, 2017

(86) PCT No.: PCT/GB2017/053837
§ 371 (c)(1),
(2) Date: Jun. 19, 2019

(87) PCT Pub. No.: WO2018/115868
PCT Pub. Date: Jun. 28, 2018

(65) Prior Publication Data
US 2019/0323994 A1    Oct. 24, 2019

(30) Foreign Application Priority Data

Dec. 20, 2016 (GB) .................................... 1621684
Jun. 16, 2017 (GB) .................................... 1709625

(51) Int. Cl.
*G01N 29/04*      (2006.01)
*G01N 29/22*      (2006.01)
(Continued)

(52) U.S. Cl.
CPC ......... *G01N 29/069* (2013.01); *G01N 29/043* (2013.01); *G01N 29/225* (2013.01);
(Continued)

(58) Field of Classification Search
CPC .... G01N 29/225; G01N 29/043; G01N 29/28; G01N 29/069; G01N 2291/056;
(Continued)

(56) References Cited

U.S. PATENT DOCUMENTS 4,458,534 A    7/1984  Kising
4,805,461 A *  2/1989  Gupta ....................... G01L 1/24
                                              250/214 VT
(Continued)

FOREIGN PATENT DOCUMENTS

CN      205593972 U    9/2016
DE    102010047707 A1  4/2012
(Continued)

OTHER PUBLICATIONS

International Search Report issued in International Application No. PCT/GB2017/053837 dated Apr. 17, 2018.
(Continued)

*Primary Examiner* — Jacques M Saint Surin
(74) *Attorney, Agent, or Firm* — Mark H. Whittenberger; Holland & Knight LLP (57) ABSTRACT

A transducer assembly for use in determining a health state of a joint (45) between first and second joined parts (42, 44); the transducer assembly comprising a transducer module (50) comprising a transducer element (100) for transmitting or receiving an ultrasonic signal to or from, respectively, the joint, and a mounting part (52) comprising an internal wedge portion (70), formed integrally with the mounting part (52), to which the transducer element (100) is fixed permanently so that the transducer module forms a unitary replaceable module.

19 Claims, 6 Drawing Sheets

(51) Int. Cl.
  *G01N 29/28* (2006.01)
  *G10K 11/00* (2006.01)
  *G01N 29/06* (2006.01)
(52) U.S. Cl.
  CPC .......... *G01N 29/28* (2013.01); *G10K 11/004* (2013.01); *G01N 2291/0234* (2013.01); *G01N 2291/044* (2013.01); *G01N 2291/0421* (2013.01); *G01N 2291/102* (2013.01); *G01N 2291/267* (2013.01)
(58) Field of Classification Search
  CPC ... G01N 2291/2634; G01N 2291/0421; G01N 2291/102; G01N 2291/267; G01N 2291/011; G01N 2291/044; G01N 2291/0234; G01N 2291/0422; G01N 2291/0258; G01K 11/004
  USPC .......................................................... 73/602
  See application file for complete search history.

(56) References Cited

U.S. PATENT DOCUMENTS

| | | | |
|---|---|---|---|
| 5,992,235 A | 11/1999 | Fischer et al. | |
| 6,070,466 A | 6/2000 | Taran et al. | |
| 9,594,058 B2 * | 3/2017 | Barry | G01N 29/221 |
| 9,964,526 B2 * | 5/2018 | Zhang | G01N 29/043 |
| 10,416,122 B2 * | 9/2019 | Barrett | G01N 29/262 |
| 10,468,953 B2 * | 11/2019 | Fujisue | F25B 31/026 |
| 2011/0088473 A1 * | 4/2011 | Nelson | G01N 29/043 |
| | | | 73/602 |
| 2015/0233869 A1 | 8/2015 | Barrett et al. | |
| 2015/0300897 A1 | 10/2015 | Xu et al. | |

FOREIGN PATENT DOCUMENTS

| | | | |
|---|---|---|---|
| GB | 2501625 | * | 10/2013 |
| WO | 8102636 A1 | | 9/1981 |
| WO | 2018115868 A1 | | 6/2018 |

OTHER PUBLICATIONS

Communication pursuant to Article 94(3) EPC dated Jun. 25, 2021 in UK Patent Application No. 17 832 324.2.
Anonymouns "Olympus/TOFD Screw-in wedges", Mar. 15, 2015 (Mar. 15, 2015), pp. 1-1, XP055774410, Retrieved from the Internet: URL:https://web.archive.org/web/20150315075835/http://www.olympus-ims.com/en/ultrasonic-transducers/tofd/.

* cited by examiner

TRANSDUCER ASSEMBLY

CROSS-REFERENCE TO RELATED APPLICATIONS

The subject application is a U.S. National Stage application of International Application No. PCT/GB2017/053837, filed on Dec. 20, 2017, which claims the priority of Great Britain Patent Application No. 1621684.8, filed on Dec. 20, 2016, and also claims the priority of Great Britain Patent Application No. 1709625.6, filed on Jun. 16, 2017. The contents of all applications are herein incorporated by reference in their entirety.

TECHNICAL FIELD

The present invention relates to ultrasonic detection and, in particular, to a transducer assembly which uses time-of-flight diffraction (TOFD) to assess a joint between parts. The invention relates in particular, but not exclusively, to a transducer assembly for determining a health state of a weld joint.

BACKGROUND

Ultrasonic testing is a non-destructive testing technique based on the propagation of ultrasonic waves in the object or material tested. In most common ultrasonic testing applications, very short ultrasonic pulse-waves with centre frequencies ranging from 0.1-15 MHz, and occasionally up to frequencies as high as 50 MHz, are transmitted into materials to detect internal flaws or to characterize materials. A common example is ultrasonic thickness measurement, which tests the thickness of the test object, to monitor pipework corrosion, and the detection of crack defects in pipework installations.

The requirement in pipework applications to assess the weld joints between pipes to check for defects is useful to anticipate failure of the weld joints to avoid potentially dangerous or damaging consequences. The testing of weld joints on pipework is critical to the safe and efficient management of pipe equipment.

For the purpose of ultrasonic testing, it is known to use transducer assemblies based on time-of-flight diffraction techniques to assess the quality of joints between two parts, in particular weld joints. The technique is based on the measurement of a time of flight of an ultrasonic pulse which irradiates the area of the weld. Measuring the amplitude of a reflected signal can be an unreliable method of sizing defects in the weld because the amplitude strongly depends on the orientation of the crack defect. Instead of amplitude, time-of-flight diffraction detectors use the time of flight of the ultrasonic pulse to determine the position and size of the crack defect which reflects the pulse to a receiver.

Known detectors typically include a pair of ultrasonic probes which are positioned on opposite sides of a weld joint. Each probe of sensor is screwed into a wedge, typically made from Perspex®. The wedge is provided with a screw-threaded recess and the sensor is screwed into the recess to secure the parts together. In use, one of the probes (the transmitter probe) emits an ultrasonic pulse that is detected by the receiver probe on the other side of the weld joint. In undamaged pipes where there are no crack defects in the weld, the signals picked up by the receiver probe derive from two waves: one wave that travels along a near surface of the weld joint and one that reflects off a far surface of the weld joint. When a crack defect is present, there is a diffraction of the ultrasonic wave from the tip(s) of the crack. Using a measured time-of-flight of the pulse, the depth of a crack tip(s) can be calculated using a trigonometry principle.

Known detectors of the aforementioned type have widespread use for detecting crack defects in weld joints of pipework. However, existing detectors of this type suffer from the problem that are inconveniently sized so that the detection of the complete annulus of the weld joint, around the full circumference of the pipe, is not always possible. Often this is due to the positioning of bolt heads around the pipe which leave only a restricted access space for the detectors. As a result, areas of the weld joint remain unassessed, so that crack defects can remain undetected which may lead to unexpected failures. Further problems exist when there is a requirement to replace the sensors as the act of screwing a new sensor into the wedge is not always convenient, especially considering the space and access limitations associated with many pipework installations.

The present invention has been devised to mitigate or overcome at least some of the above-mentioned problems.

SUMMARY OF THE INVENTION

According to an aspect of the present invention there is provided a transducer assembly for use in determining a health state of a joint between first and second joined parts; the transducer assembly comprising a transducer module comprising a transducer element for transmitting or receiving an ultrasonic signal to or from, respectively, the joint, and a mounting part comprising an internal wedge portion, formed integrally with the mounting part, to which the transducer element is permanently fixed so that the transducer module forms a unitary replaceable module.

Ultrasonic testing is often performed on steel and other metals and alloys, although it can also be used on concrete, wood and composites, albeit with less resolution. It is used in many industries including steel and aluminium construction, metallurgy, manufacturing, aerospace, automotive and other transportation sectors.

The present invention provides the advantage of a transducer assembly which may be used in any of the aforementioned applications with convenience and ease. Benefits are provided by virtue of securing a transducer element securely to the wedge portion of the transmitter/receiver module, for example by means of an adhesive, so that the whole module forms a replaceable part. Thus, there is no need to remove or replace the transducer element in the event of a fault. In addition, the module can be made to be particularly compact so as to allow use even in the most restrictive of situations.

The invention is particularly useful for assessing the health state of a localised weld joint within a wider region of a part or joined parts and, for example, for determining a health state of joined parts in the form of joined pipes.

One of the problems with a known transducer assembly is that, when replacement of the transmitter/receiver element is required, the existing transducer element must be unscrewed from the wedge portion, in potentially awkward locations, to be replaced with a new transmitter/receiver element. The replacement process is inconvenient for the user, and it is difficult to replicate the exact re-positioning of the new transducer element within the existing wedge portion, leading to inaccuracies of detection. These disadvantages are overcome by the present invention which provides a disposable transducer of compact size. The benefit is at least partially realised by virtue of the integration of the mounting part of the transducer with the wedge part of the transducer, with the two parts being machined from a single piece of material (e.g. Perspex) to form a unitary part. For the purpose of the following description, therefore, reference to the wedge portion being formed integrally with the mounting part shall be taken to mean that the wedge portion and the mounting part are machined or otherwise formed together from a single piece of material.

The realisation that there are benefits in forming the wedge portion and the mounting part from one and the same piece is in complete contrast to traditional TOFD system which necessarily rely on these parts being separately formed so that transducer elements can be conveniently removed from the mounting part when they require replacement.

In one embodiment, the wedge portion includes a substantially flat face to which the transducer element is fixed.

In one embodiment, the mounting part is provided with a recess and wherein the transducer element is received within the recess.

The transducer assembly may include a filler material arranged to fill excess space within the recess once the transducer element has been mounted within the recess.

The upper surface of the transducer module may be substantially flat, for example by shaping the surface of the filler material, which lends itself to convenient usage in restricted spaces, particularly in the vicinity of nuts and bolts.

The filler material may therefore define at least a part of the flat upper surface of the transducer module.

The filler material may include an adhesive material.

The transducer element may be fixed permanently to the wedge portion by means of an adhesive.

The transducer assembly may further comprise a flow means for transporting couplant to a surface of the mounting part which abuts the parts under test, in use, during determination of the health state.

Typically, the use of couplant is important because it provides a medium by which sound energy can be transmitted between the transducer module and the part under test. By providing such a flow means as part of the module, a continuous supply of couplant can be delivered to the surface of the parts under test, without the need to continually apply a couplant using external means.

For example, the flow means may include at least one channel provided within the mounting part to which a supply of couplant may be provided continuously.

The transducer assembly may further comprise means for determining the health state of the joint based on a reflected signal from the joint.

The health state of the joint to be determined is, typically, categorised as one of a defective state or a non-defective state.

In one embodiment, the means for determining may be a processor which receives the reflected signal from the joint.

The transducer may comprise an electrical circuit fixed to the transducer element, for example by means of an adhesive.

The adhesive may form a backing layer on the transducer element modifies or shortens the pulse width of the wave form generated by the transducer (shortens compared to the pulse width without the backing layer). Typically, the backing layer is in direct contact with the transducer element.

The transducer assembly may further comprise an electrical connection means for transmitting electrical signals to or from the transducer module via the electrical circuit.

The electrical connection means may include a connecting wire or cable which projects from the transducer module.

The transducer module may be generally cuboid in shape. The transducer module may include at least four rectangular faces.

In one embodiment, one of the four rectangular faces may further include a chamfered surface between two of the rectangular faces.

Typically, the mounting part may be formed, at least in part, from a plastic e.g. Perspex® or PEEK.

The transducer assembly may comprise both a transmitter module and a receiver module, whereby, in use, the transmitter module and the receiver module are spaced apart on the joined parts to determine the health state of the joint under test. Conveniently, the transmitter module and the receiver module are movable relative to one another to adjust their relative spacing.

In practice the modules are near-identical in construction, with one being controlled as a transmitter module and one being controlled as a receiver module.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Time-Of-Flight Diffraction (TOFD) is a non-destructive testing technique that is based on a reflected wave response, rather than an amplitude wave response. The technique uses forward scattered tip diffraction and reflection of transmitted ultrasonic pulses to identify the presence, location and size of defects in the joint.

Figure 1:
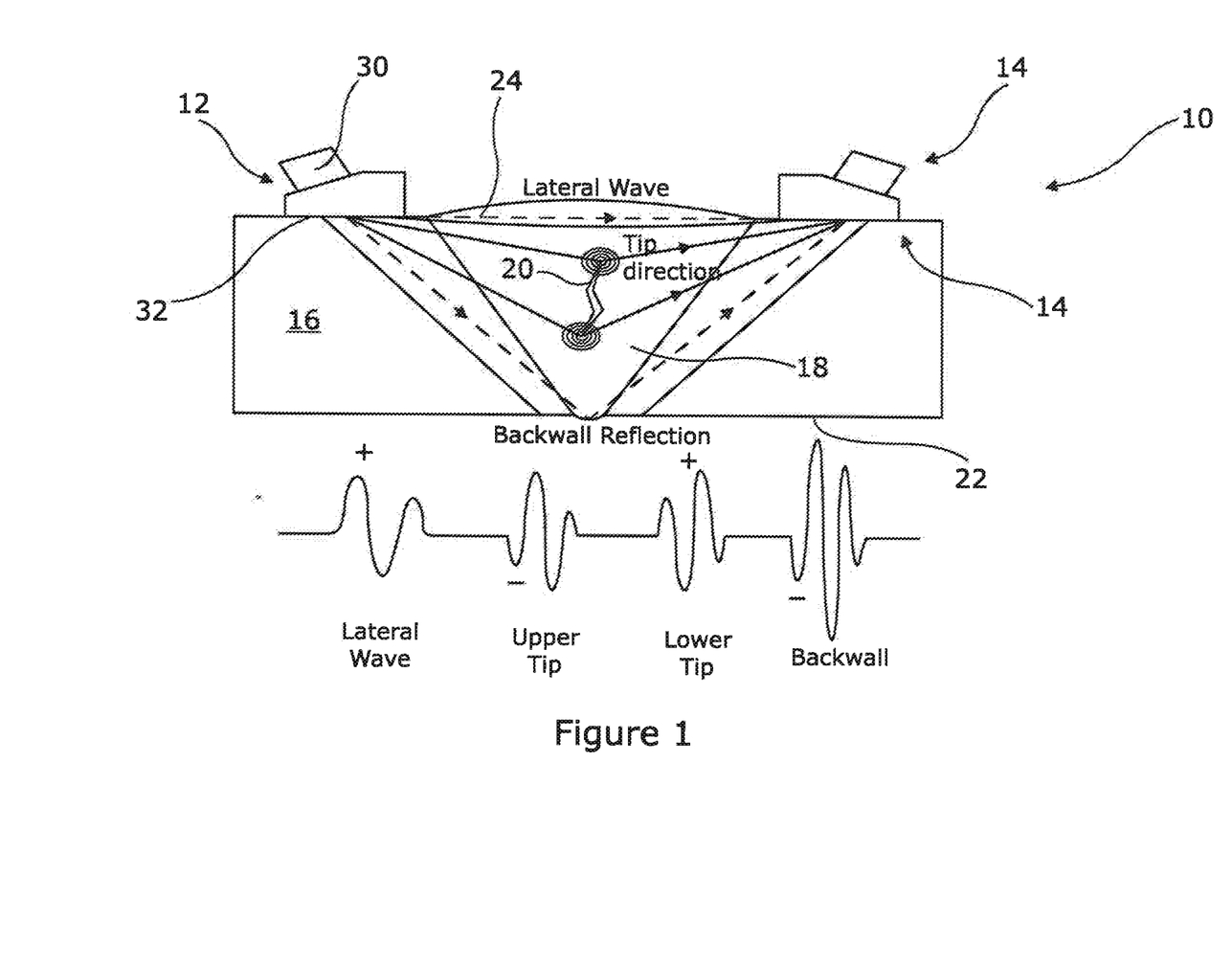
FIG. 1 is a schematic diagram of a known transducer assembly, including a transmitter module and a receiver module, to illustrate the principle of Time-Of-Flight Diffraction (TOFD)

FIG. 1 is a schematic diagram of a known TOFD assembly 10 to illustrate the principle which can be used to determine the state of health of a weld joint 18 between two parts. The assembly 10 consists of two modules: a transmitter module 12 and a receiver module 14. The transmitter module 12 is arranged on a front surface of the pipe 16 under test, to one side of the location of the weld joint 18. The receiver module 14 is also arranged on the front surface of the pipe 16 under test, laterally spaced from the transmitter module 12 on the other side of the weld joint.

The transmitter module 12 is a wide beam transmitter and an ultrasonic pulse is transmitted by the transmitter module 12, passing through the weld joint 18 and being incident on the rear face 22 of the weld joint from where it is reflected back to the receiver module 14. A proportion of the beam is also transmitted laterally across the front face surface 24 of the weld joint 18 to the receiver module 14. The positions of the transmitter module and the receiver module are movable, relative to one another, to control the Probe Centring Spacing (PCS).

The weld joint 18 includes a defect 20 located approximately centrally within the weld joint 18. In the case where there is no defect within the weld joint, the reflected wave received at the receiver module 14 consists of the reflected wave from the rear face surface 22 of the weld joint 18 together with the wave transmitted directly to the receiver module 14 across the material surface 24 of the weld joint 18. The arrival time of the reflected wave from the rear face surface 22, compared to the arrival time of the transmitted wave from the transmitter module 12 directly across the material surface 24, can be used to derive the depth of the weld joint 18 using trigonometric principles. In the case where the defect 20 is present within the weld joint 18, the ultrasonic waves will be diffracted by the edges of the defect (as shown in FIG. 1) and, hence, the arrival time of the reflected wave at the receiver module 14 will be different to the case of a non-defective weld joint. The depth of the defect can be determined from the arrival time of the diffracted wave using trigonometric principles.

The transmitter and receiver modules 12, 14 in the known ultrasonic detector of FIG. 1 are both of the same construction but are operated either to transmit or receive ultrasound. The transmitter module 12, for example, includes a crystal-carrying element 30 which, upon application of an electrical signal, is arranged to emit an ultrasonic wave towards a wedge portion 32 of the transmitter module which serves to refract the wave before it is emitted from the module 12. The transmitter module includes a transmitter housing provided with a screw-threaded recess into which the crystal-carrying element 12, which is provided with a corresponding screw thread, is received. The wedge portion 32 forms an internal part of the housing and the crystal-carrying element 30 protrudes from the upper surface of the housing (as can be seen in FIG. 1) to allow screwing of the crystal-carrying element 30 into and out of the recess if it is desired to replace the crystal-carrying element 30 (for example, if there is a fault).

During assembly, a couplant is introduced into the recess before the crystal-carrying element 30 is screwed into the housing so that, once assembled, when the crystal-carrying element 30 emits an ultrasonic wave towards the wedge portion, the wave passes through the couplant. The use of the couplant ensures sound wave energy is not lost between the crystal-carrying element and the wedge. A couplant is also required between the underside of the transmitter module 12 and the material surface 24 of the pipe 16 under test for the same purpose.

The receiver module 14 is of the same construction to the transmitter module, including a crystal-carrying element which is screwed into a recess in a receiver housing provided with a wedge portion within the recess. The wedge portion receives reflected sound waves from the pipe under test which is then directed to the crystal of the receiver module for detection. As in the transmitter module, the crystal-carrying element projects from the recess in the receiver housing to allow the crystal element to be screwed into or out of the housing for replacement.

Although the process of ultrasonic detection is the same in the transducer assembly of the present invention, the invention provide benefits over the known transducer assembly as shown in FIG. 1, as will now be described with reference to FIGS. 2 to 10.

Figure 2:
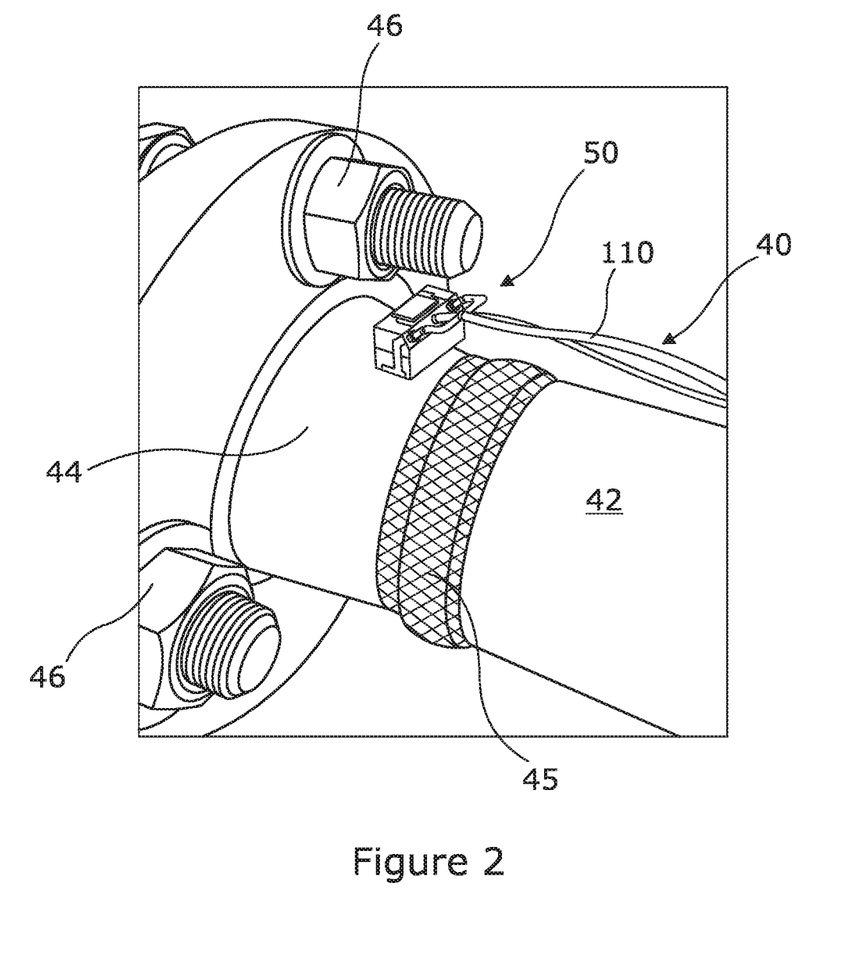
FIG. 2 is a perspective view of a transmitter module of a transducer assembly of an embodiment of the invention, when in use for testing a weld joint on pipework.

FIG. 2 shows a perspective view of pipework 40 with which the transducer assembly of the invention may be used to determine the health state of the weld joint within the pipework. The pipework comprises a first pipe 42 and a flange 44 which are coupled together via a weld joint 45 to be assessed. The flange 44 of the first pipe 42 abuts another flange (not shown) provided on a second pipe (also not shown) to which the first pipe 42 is to be connected. A plurality of nut and bolt arrangements 46 are arranged around the circumference of the mating flanges to connect the flanges together. Replacement of a pipe, if necessary, can therefore be achieved conveniently by disconnecting the flanges of adjacent pipes.

Figure 3:
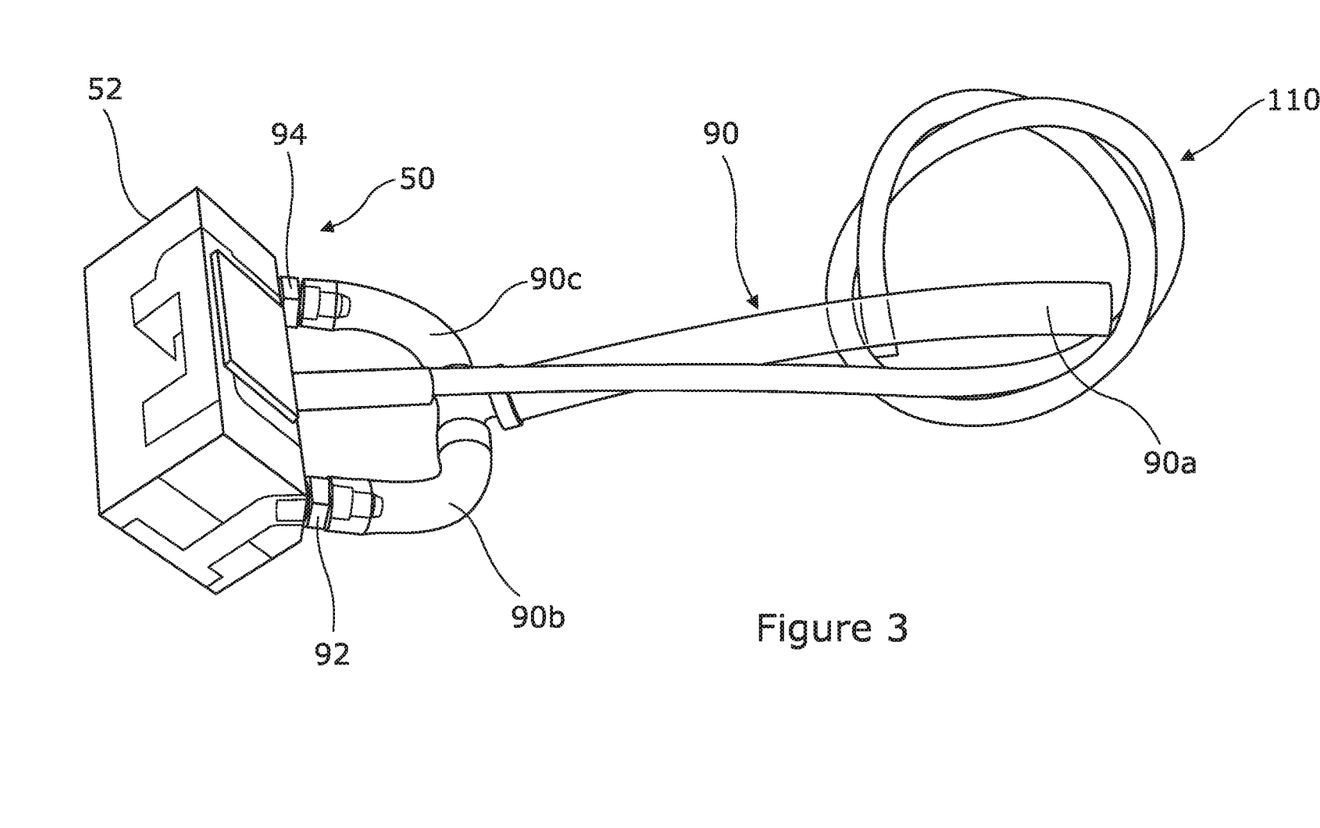
FIG. 3 is a perspective view of the transmitter module in FIG. 2 when removed from the pipework.

When it is required to assess the state of health of the weld joint, a transmitter module 50 and a receiver module (not shown) are both placed on the surface of the pipe 40, at spaced locations around the pipe circumference (as described with reference to FIG. 1). FIG. 3 shows a perspective view of only the transmitter module 50 when placed on the pipe 40. The receiver module is of the same construction, and in its method of assembly, and will be described later. In use, by moving the transmitter module 50 and the receiver module around the circumference of the pipe, different areas of the weld joint around the pipe circumference can be assessed. In practice the transmitter module 50 and the receiver module (not shown) are of the same construction, with one being arranged to transmit ultrasound and the other being arranged to receive ultrasound. Both the transmitter module and the receiver module may therefore be considered to be 'transducer modules', differing only by the purpose for which they are used.

Due to the presence of the nut and bolt arrangements 46 arranged around the flange, when the known transducer assembly 10 (as shown in FIG. 1) is used on the pipework 40, some areas of the weld remain unassessed due to the restricted access for the transmitter and the receiver modules at these locations. This presents a problem for accurate determination of the state of health of the weld joint, and leaves defective areas liable to remain undetected which can cause a hazard.

The present invention avoids this disadvantage using the transducer assembly described with reference to FIGS. 2 to 10. FIGS. 4 to 7 show a transmitter module of the transducer assembly, and it is this element of the assembly that will be described in detail.

The transmitter module 50 includes a mounting part 52 which is provided with an integrally formed wedge portion internal to the mounting part. In other words, the wedge portion is formed in one with the mounting part. Typically, the mounting part 52 together with the integral wedge portion are formed from Perspex® or PEEK.

Figure 4:
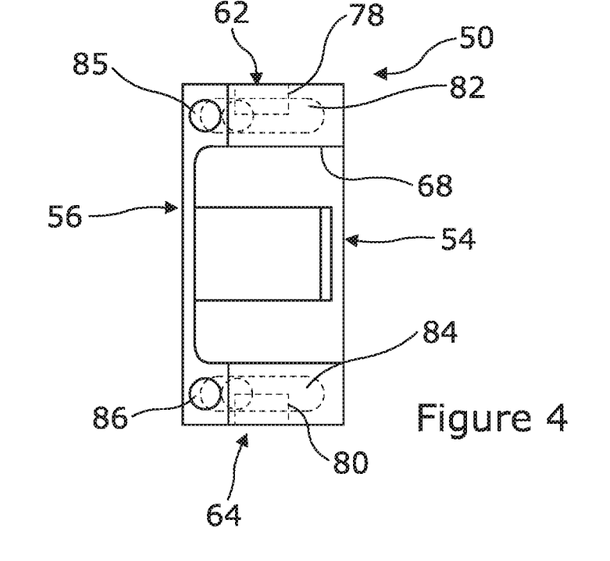
FIG. 4 is a top plan view of the transmitter module in FIGS. 2 and 3.
Figure 5:
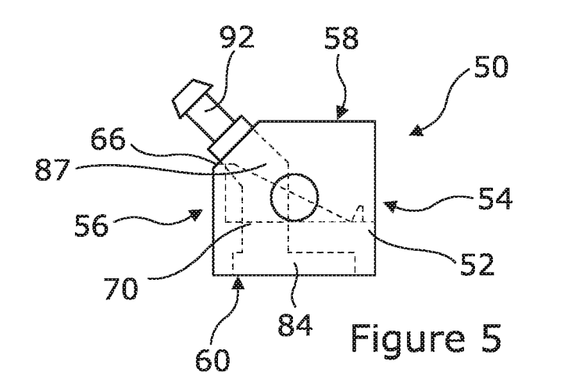
FIG. 5 is a first side view of the transmitter module in FIGS. 2 to 4.

In its raw state, and before the transmitter module is fully assembled, the mounting part 52 is of generally cuboid shape having a front face 56, a rear face 54, an upper face 58 and a lower face 60, together with left and right side faces 62, 64, as seen in FIG. 4. The plan of the upper face 58 can be seen in the top view of FIG. 4. In practice the lower surface 60 of the mounting part 52 may be shaped to conform to the surface of the pipework under test, with which it mates in use. The intersection of the front face 56 and the upper face 58 is provided with a chamfer to define a front angled surface 66.

The mounting part 52 is provided with a central recess 68 which is open at the rear and upper surfaces 54, 58 of the mounting part 52. A wedge portion 70 (as shown in FIG. 6) resides within the recess 68, being formed integrally and as one part with the mounting part 52 and being located at the base of the recess 68.

Figure 6:
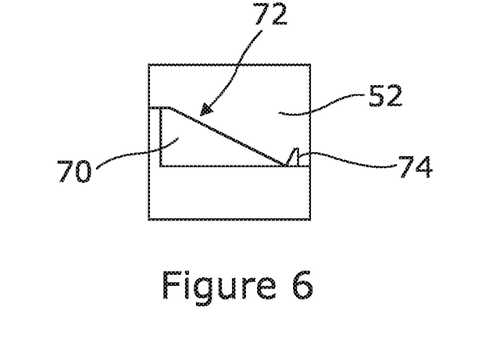
FIG. 6 is a view of a part of the transmitter module in FIG. 5 to show a wedge portion of the transmitter module in more detail.
Figure 7:
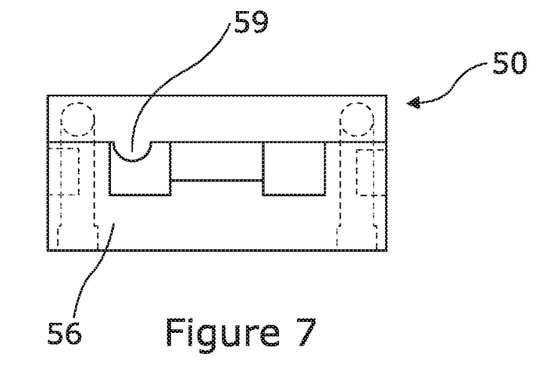
FIG. 7 is a view from the front of the transmitter module in FIGS. 2 to 6.

The wedge portion 70 includes a substantially flat, angled surface 72 (as shown in FIG. 6) to which a transducer element (not shown in FIGS. 4 to 7) is directly attached. The transducer element typically takes the form of a crystal element such as composite crystal (lead zirconium titanate doped with La2O3 (lanthanum oxide)), lead metaniobate, and lead zirconate titanate. Other examples are also possible. The material of the crystal element 100 is selected so that, when an electrical signal is applied to the crystal to excite the crystal, the transducer element emits ultrasound in the required ultrasonic frequency range, typically between 0.1- 15 MHz. The wedge portion 70 is provided with an upstand 74 at its lowermost end (as shown in FIG. 6) which serves to locate the crystal element during assembly, as will be described in further detail below. Crucially, the crystal element is securely attached to the wedge portion 70 so that it is immovable without damage being caused to the parts.

In use, ultrasonic waves emitted from the crystal element are refracted by the wedge portion 70 and emerge from the lower surface 60 of the mounting part 52 in a beam having a beam angle which depends on a face angle (incident angle) of the angled surface of the wedge portion 70. Typically, the refracted ultrasound angle may be 45 degrees, 60 degrees or 70 degrees (measured to the vertical), although other angles are also envisaged.

On each of the left and right side faces 62, 64 a recess, 78, 80 respectively, is provided for receiving a part of a scanner apparatus (not shown) when the transmitter module is in use. The scanner apparatus carries engagement members which are received within a respective recess and which cooperate with the mounting part 52 to enable its position on the pipe to be adjusted as the scanner apparatus is moved, moving the transmitter module with it.

A flow means in the form of left- and right-side elongate channels 82, 84 are provided in the lower surface 60 of the mounting part 52. The channels 82, 84 extend generally between the rear face 54 and the front face 56 of the mounting part 52, but are not open at the faces 54, 56 and are closed at each end by a part-circular end wall. The channels 82, 84 are open at the lower surface 60. Each channel communicates with an internal channel (one of which, 87, is visible in FIG. 5) for transporting a couplant (e.g. a liquid) to the channels 82, 84, in use. The couplant is received through a respective opening 85, 86 provided on the front angled surface 66, one opening 85, 86 being located on each side of the recess 68. The couplant is delivered to the openings via a supply line 90.

Referring to FIG. 3, the supply line 90 includes a main channel 90*a* which communicates with a supply of couplant (not shown) located at one end of the main channel 90. At its other end, the main channel branches into two branch channels 90*b*, 90*c*, each of which delivers couplant to a respective one of the channels 82, 84 via a respective connecting portion 92, 94.

In use, the couplant is delivered, via the supply line 90 and the channels 90, 90*a*, 90*b*, 82, 84, to the lower surface 60 of the mounting part 52 so as to provide an intermediate layer of couplant between the module and the pipework under test. The use of a couplant in this way is well known and is necessary because sound energy at the ultrasonic frequencies typically used for non-destructive testing is not effectively transmitted through air. Aside from attenuation effects, air represents an acoustic impedance mismatch with respect to the lower surface of the transducer element and typical materials of the pipework. Even an extremely thin air gap between the transducer and the test piece prevents efficient sound energy transmission, and so makes the use of a couplant a necessity.

The method by which the transducer assembly of the invention may be assembled will now be described with further reference to FIGS. 8 to 10.

In a first stage, the wedge portion 70 is cleaned using a removal agent (e.g. acetone) to remove grease products and other contaminants which may affect the performance of the module, in use, and in particular the transmission of ultrasound from the crystal element 100 to the wedge portion 70. The crystal element 100 is then cleaned by dipping it in a removal agent (e.g. acetone) also.

Figure 8:
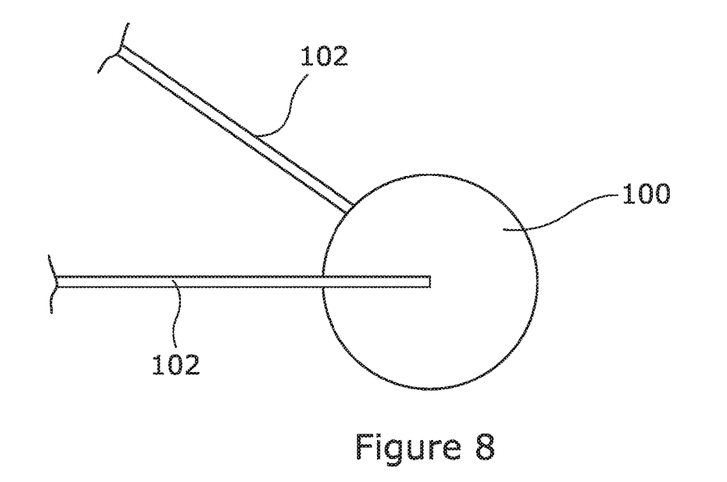
FIG. 8 shows a plan view of the crystal of the transmitter module with an electrically conductive layer applied to each side.

Referring to FIG. 8, an electrically conductive means 102 is then adhered to the crystal element. The electrically conductive means 102 typically takes the form of electrically conductive strips, one of which is applied to each side of the crystal element 100 and serves the purpose of transmitting electrical signals to, or from, the crystal element. Typically the conductive strips 102 may take the form of silver strips adhered to the crystal element 100.

In a next step, a first side of the crystal element 100 is adhered directly to the angled surface 72 of the wedge portion 70 using an adhesive (i.e. there are no intervening elements between the crystal element 100 and the wedge portion 70 other than the conductive strips 102). Typically the adhesive used for this purpose may be Loctite®. Excess adhesive which splays out from the mating surfaces may be removed with a scalpel.

Figure 9:
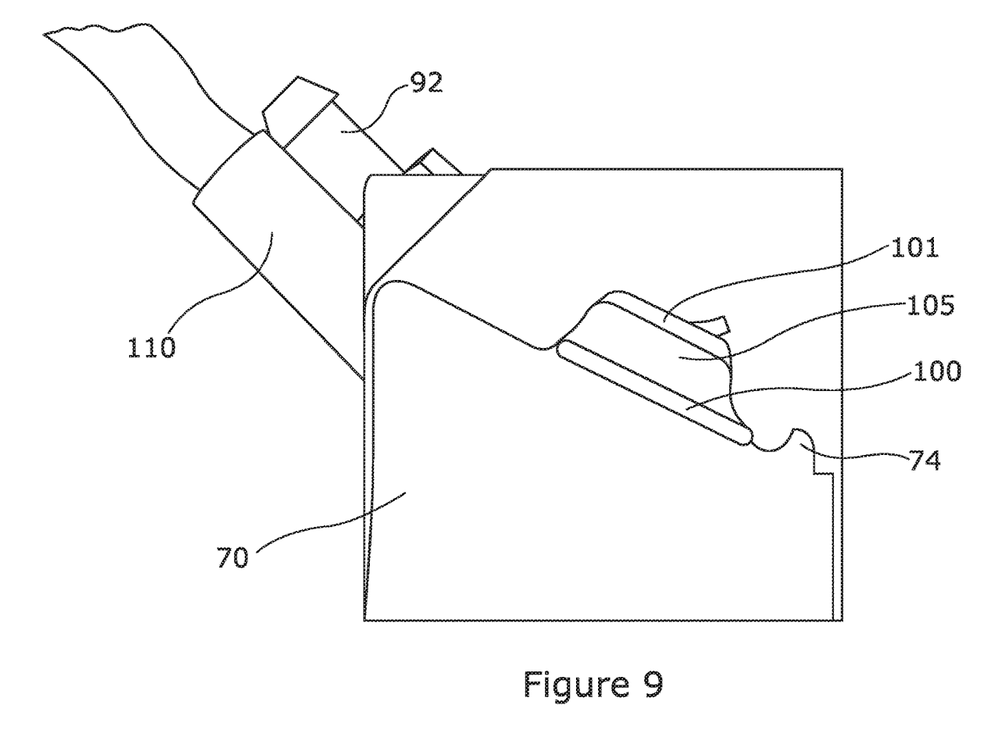
FIG. 9 is a side view of the transmitter module to show the crystal assembled on a wedge portion of the transmitter module.

Referring also to FIG. 9, once the first side of the crystal element 100 is adhered to the wedge portion 70, a further adhesive 105 is applied directly to a second opposed side of the crystal element 100 for the purpose of attaching a printed circuit board 101. The further adhesive may be a mix of tungsten and araldite. The rapid araldite and the tungsten powder are mixed together thoroughly before application to the crystal element 100 with a layer thickness that is broadly similar to the thickness of the crystal element (i.e. if a thicker crystal element is used, the further adhesive layer must be thicker). A thicker layer of adhesive 105 may also be used, as shown in FIG. 9. The further adhesive layer on the second side of the crystal is left to be cured for a few minutes before the next processing steps.

The further adhesive layer 105 provides two functions. Firstly, the adhesive layer 105 provides the adhesion required to secure the printed circuit board 101 firmly to the wedge portion 70. Secondly, the adhesive layer 105 provides a means by which the pulse width generated by the crystal element is modified or shortened for pulse optimisation.

Once the further adhesive 105 has been cured, the printed circuit board 101 having left- and right-side tracks, 103, 104 respectively, is applied to the further adhesive layer with Loctite®.

FIG. 9 shows a section view of the transmitter module, including the wedge portion 70 to which the crystal element 100, the further adhesive 105 and the printed circuit board 101 are applied.

Figure 10:
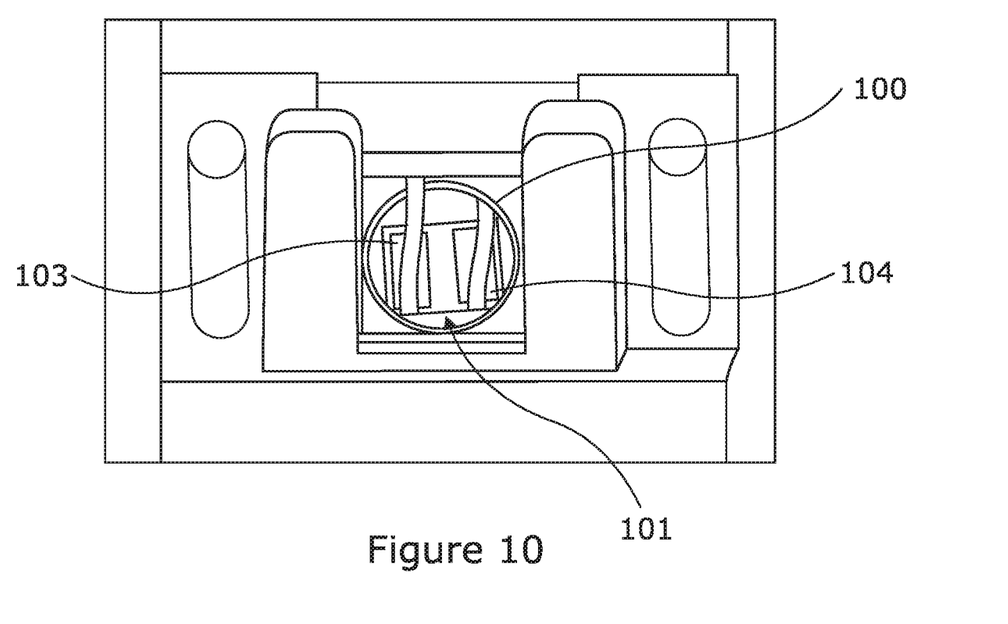
FIG. 10 is a plan view of the transmitter module with the crystal in situ and showing a printed circuit board applied to the crystal.

Referring to FIG. 10, the conductive strips 102 are then soldered to the tracks of the printed circuit board 101 so as to connect one of the conductive strips to the left-side printed circuit board track and the other of the conductive strips to the right-side printed circuit board track.

A connecting wire or cable 110 (as shown in FIG. 2) is then prepared for the transmitter module. Typically, cable preparation may involve taking a standard off-the-shelf cable (e.g. RG178 cable) and modifying a core and a sheath of the cable so as to extend these conductive parts of the cable by means of additional wire lengths. The additional lengths of wire are then connected to the printed circuit board 101 by passing the wire lengths through a drilling (not shown) in the rear wall of the mounting part 52.

Once the additional wire lengths have been passed through the drilling, the wires are soldered to the tracks of the printed circuit board 101 whilst the mounting part 52 is held within a mould. A putty or sealant (e.g. Blu-Tac® made by Bostic) is then applied to the drilling in the rear wall of the mounting part 52 to seal any gaps and to protect the opening into the mounting part during the later processing steps. The sealant is also applied around the entire mould containing the mounting part 52 to prevent any leakage of a further putty, or filler, which is used in the next part of the assembly process.

The further putty, or filler, is prepared, including a colouring agent. The filler is then poured or otherwise applied into the opening in the upper surface 58 of the mounting part 52, filling the volume of the recess 68 and surrounding the printed circuit board and crystal assembly contained therein. The filler is poured at an angle, and slowly, to ensure no bubbling of the filler occurs during this process.

The filler is poured into the recess until the excess space within the recess 68 is completely filled and the filler extends beyond the upper surface 58 of the mounting part 52 to define a protruded layer of filler on top of the mounting part 52. The filler is then allowed to cure overnight, after which the module can be removed from the mould and is ready for a final profiling steps.

A profiling process is used to level of the layer of filler which protrudes from the upper surface of the mounting part 52, so as to leave a substantially flat upper surface (as shown in the figures). The lower surface 60 of the mounting part may also be profiled so as to define a curvature which corresponds to the curvature of the pipework to be tested by the module, as mentioned previously.

In order to use the transducer assembly, a pair of modules consisting of one transmitter module and one receiver module is applied to the pipe under test. Typically the transmitter and receiver modules are mounted in a scanner apparatus which is operable to move the modules so as to vary the position of the modules around the pipe circumference, making sure the full circumference of the joint is tested. Electrical signals are applied to the crystal element 100 of the transmitter module, via the connecting wires 110 and the printed circuit board 101, under the control of a control module which is typically located remotely from the scanner apparatus. The control module includes processor, in a conventional manner, which receives signals reflected from the crystal element of the receiver module to be detected and processed in software and analyses the signals to determine whether there are any unwanted defects in the joint. Conventional means for transmitting the signals to, and receiving and analysing the signals from, the transducer assembly are employed and so will not be described in further detail.

The final transducer assembly comprises transmitting and receiving modules which are unitary replaceable parts. Typically, the transducer assembly is sold as a pair of modules comprising a transmitter module and a receiver module. The transmitter and receiver modules may have wedge portions 70 with the same refracted ultrasound angle (for example, 45 degrees and 45 degrees), or may be supplied with different refracted ultrasound angles (for example, 45 degrees and 60 degrees) depending on the particular application. It is also possible for a receiver module of one module pair to be used with a transmitter module of another module pair, where different angle pairings may be useful.

Figure 11:
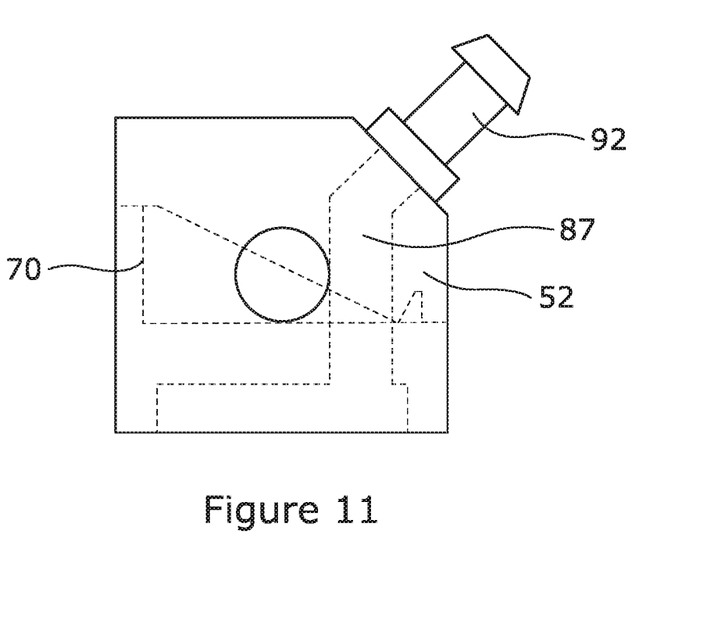
FIG. 11 is a side view of the transmitter module of an alternative embodiment.

The modules may be "right" or "left" handed so that the connecting cable and couplant supply line may extend either from one side of the upper surface of the module or the other. FIG. 11 shows a side view of a module configured with the opposite handedness to that shown in the previous figures.

Each module of the assembly is a small, generally cuboid module which can be conveniently located in small and restricted areas for pipe testing, avoiding obstacles like nuts and bolt arrangements which pose problems for known ultrasonic detection equipment. In the event of a failure of either a transmitter module or a receiver module, the crystal element is not replaced, as in the prior art, but the faulty module is disposed of and a new module is employed in its place. This avoids the need for the awkward processes associated with conventional ultrasonic detectors which require new transducer elements to be screwed into existing wedges when a fault occurs. Because the present invention provides a relatively inexpensive module construction, using relatively inexpensive materials such as adhesives and fillers to adhere the crystal, wedge and printed circuit board together, the disposable nature of the product does not pose a problem for the user and provides only advantages in terms of testing convenience.

Different colouring agents may be used for the filler as a means of distinguishing different types of module. For example, the refracted ultrasound angle of the wedge portion may dictate the colour of the filler material so that, in an instant, a user can differentiate one module type from another.

Many modifications may be made to the above examples without departing from the scope of the present invention as defined in the accompanying claims.

The invention claimed is:

1. A time-of-flight diffraction (TOFD) transducer assembly for use in determining a health state of a joint (45) between first and second joined parts (42, 44), the transducer assembly comprising:
   a pair of modules consisting of a transmitter module and a receiver module wherein the transmitter module is a transducer module (50) comprising a single transducer element (100) for transmitting an ultrasonic signal to the joint (45), and the receiver module is a transducer module comprising a single transducer element for receiving an ultrasonic signal from the joint, and each module comprises a mounting part (52) comprising an internal wedge portion (70), formed integrally with the mounting part (52), each wedge portion including a substantially flat face to which a respective one of the transducer elements (100) is fixed permanently so that each module (50) forms a unitary replaceable module.

2. The transducer assembly as claimed in claim 1, wherein the mounting part (52) is provided with a recess (68) and wherein the transducer element (100) is received within the recess.

3. The transducer assembly as claimed in claim 2, comprising a filler material arranged to fill excess space within the recess (68) once the transducer element (100) has been mounted within the recess.

4. The transducer assembly as claimed in claim 3, wherein the filler material defines at least a part of a flat upper surface of the transducer module (50).

5. The transducer assembly as claimed in claim 4, wherein the filler material includes an adhesive material.

6. The transducer assembly as claimed in claim 1, wherein the transducer element (50) is fixed permanently to the wedge portion (70) by means of an adhesive.

7. The transducer assembly as claimed in claim 1, further comprising a flow arrangement (82, 84, 97) for transporting couplant to a surface (60) of the mounting part (52) which abuts the parts (42, 44), in use, during determination of the health state of the joint.

8. The transducer assembly as claimed in claim 7, wherein the flow arrangement includes at least one channel (82, 84, 87) provided within the mounting part (52).

9. The transducer assembly as claimed in claim 1, further comprising an arrangement for determining the health state of the joint based on a reflected signal from the joint (45).

10. The transducer assembly as claimed in claim 9, wherein the health state of the joint (45) is one of a defective state or a non-defective state.

11. The transducer assembly as claimed in claim 9, wherein the arrangement for determining the health state of the joint is a processor which receives the reflected signal from the joint.

12. The transducer assembly as claimed in claim 1, comprising an electrical circuit (101) fixed to the transducer element (100).

13. The transducer assembly as claimed in claim 12, wherein the electrical circuit (101) is fixed to the transducer element (100) by means of an adhesive.

14. The transducer assembly as claimed in claim 13, wherein the adhesive is selected so as to modify a pulse width of a wave generated by the transducer element (100).

15. The transducer assembly as claimed in claim 13, further comprising an electrical connection arrangement (110) for transmitting electrical signals to or from the transducer module (50) via the electrical circuit (100).

16. The transducer assembly as claimed in claim 15, wherein the electrical connection arrangement includes a connecting wire or cable (110) which projects from the transducer module (50).

17. The transducer assembly as claimed claim 1, wherein when in use, the transmitter module and the receiver module are spaced apart on the joined parts.

18. The transducer assembly as claimed in claim 17, wherein the transmitter module and the receiver module are movable relative to one another to adjust their relative spacing.

19. The transducer assembly as claimed in claim 1, for determining a health state of joined parts in the form of joined pipes.

* * * * *